United States Patent
Aghili et al.

(10) Patent No.: US 12,425,867 B2
(45) Date of Patent: Sep. 23, 2025

(54) REGISTRATION AND SECURITY ENHANCEMENTS FOR A WTRU WITH MULTIPLE USIMS

(71) Applicant: InterDigital Patent Holdings, Inc., Wilmington, DE (US)

(72) Inventors: Behrouz Aghili, Commack, NY (US); Samir Ferdi, Kirkland (CA); Alec Brusilovsky, Downingtown, PA (US); Ulises Olvera-Hernandez, Montreal (CA); Xiaoyan Shi, Westmount (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 196 days.

(21) Appl. No.: 17/635,486

(22) PCT Filed: Aug. 13, 2020

(86) PCT No.: PCT/US2020/046124
§ 371 (c)(1),
(2) Date: Feb. 15, 2022

(87) PCT Pub. No.: WO2021/034593
PCT Pub. Date: Feb. 25, 2021

(65) Prior Publication Data
US 2022/0345894 A1    Oct. 27, 2022

Related U.S. Application Data

(60) Provisional application No. 62/888,109, filed on Aug. 16, 2019.

(51) Int. Cl.
*H04W 12/72* (2021.01)
*H04L 9/40* (2022.01)
(Continued)

(52) U.S. Cl.
CPC ......... *H04W 12/72* (2021.01); *H04L 63/0853* (2013.01); *H04W 8/18* (2013.01);
(Continued)

(58) Field of Classification Search
CPC ....... H04W 12/06; H04W 12/72; H04W 8/18; H04W 12/40; H04W 60/00; H04W 12/08;
(Continued)

(56) References Cited

U.S. PATENT DOCUMENTS

| | | |
|---|---|---|
| 8,594,670 B2 | 11/2013 | Chin et al. |
| RE45,161 E | 9/2014 | Westman et al. |

(Continued)

FOREIGN PATENT DOCUMENTS

| | | |
|---|---|---|
| CN | 101600205 A | 12/2009 |
| CN | 103039053 A | 4/2013 |

(Continued)

*Primary Examiner* — Matthew Smithers
*Assistant Examiner* — Brandon Binczak
(74) *Attorney, Agent, or Firm* — Flaster Greenberg P.C.

(57) ABSTRACT

Methods and apparatuses are described herein for registration and security for wireless transmit/receive units (WTRUs) with multiple universal subscriber identity modules (USIMs). Optimized registration and authentication procedures, that enable a WTRU to register and authenticate multiple USIMs during one registration and authentication procedure are described herein. The techniques described herein may eliminate the need for separate registration and authentication procedures for each USIM. A gateway device may inform the network in a Registration Request message that it is registering multiple devices (i.e., multiple WTRUs). The network and the gateway may then perform an authentication procedure with an aggregate challenge/response (i.e., a single challenge for each WTRU). A WTRU may inform the network in a Registration Request message that it is registering multiple USIMs. The network and the
(Continued)

WTRU may then perform an authentication procedure with an aggregate challenge/response (i.e., a single challenge for all USIMs).

20 Claims, 10 Drawing Sheets

(51) Int. Cl.
    *H04L 65/1069* (2022.01)
    *H04L 65/1073* (2022.01)
    *H04W 8/18* (2009.01)
    *H04W 12/06* (2021.01)
    *H04W 12/40* (2021.01)

(52) U.S. Cl.
    CPC ........... *H04W 12/06* (2013.01); *H04W 12/40* (2021.01); *H04L 65/1069* (2013.01); *H04L 65/1073* (2013.01)

(58) Field of Classification Search
    CPC ............... H04W 12/45; H04L 63/0853; H04L 65/1069; H04L 65/1073; H04L 63/08; H04L 9/3271
    See application file for complete search history.

(56) References Cited

U.S. PATENT DOCUMENTS

| | | | |
|---|---|---|---|
| 9,094,823 B2 | 7/2015 | Saino et al. | |
| 9,712,452 B2 | 7/2017 | Walke | |
| 9,854,004 B2 | 12/2017 | Bharadwaj | |
| 10,075,839 B2 | 9/2018 | Zhang | |
| 10,090,874 B2* | 10/2018 | Madej | H04B 1/3816 |
| 10,136,307 B2 | 11/2018 | Cho et al. | |
| 2009/0083833 A1 | 3/2009 | Ziola et al. | |
| 2011/0307694 A1 | 12/2011 | Broustis et al. | |
| 2013/0219180 A1 | 8/2013 | Saino et al. | |
| 2016/0191510 A1 | 6/2016 | Näslund et al. | |
| 2016/0269891 A1 | 9/2016 | Li et al. | |
| 2017/0134945 A1* | 5/2017 | Goel | H04W 48/18 |
| 2018/0067671 A1 | 3/2018 | Marripudi et al. | |
| 2018/0191695 A1 | 7/2018 | Lindemann | |
| 2019/0098502 A1 | 3/2019 | Torvinen et al. | |
| 2022/0078742 A1* | 3/2022 | Tiwari | H04W 60/005 |
| 2022/0232442 A1* | 7/2022 | Hong | H04W 8/20 |

FOREIGN PATENT DOCUMENTS

| | | | | |
|---|---|---|---|---|
| CN | 105554912 A | 5/2016 | | |
| CN | 107079236 A | 8/2017 | | |
| CN | 108353281 A | 7/2018 | | |
| EP | 2773140 A1 * | 9/2014 | ............ | H04L 63/08 |
| JP | 2018041448 A | 3/2018 | | |
| JP | 2018538724 A | 12/2018 | | |
| KR | 10-0958349 B1 | 5/2010 | | |
| WO | WO 2014/117811 A1 | 8/2014 | | |
| WO | 2018011078 A1 | 1/2018 | | |
| WO | WO 2018/147711 A1 | 8/2018 | | |

* cited by examiner

REGISTRATION AND SECURITY ENHANCEMENTS FOR A WTRU WITH MULTIPLE USIMS

CROSS-REFERENCE TO RELATED APPLICATIONS

This application is the National Stage Application of International Patent Application No. PCT/US2020/046124, filed Aug. 13, 2020, which claims the benefit of U.S. Provisional Patent Application No. 62/888,109, filed Aug. 16, 2019, which is hereby incorporated by reference in its entirety.

BACKGROUND

When a wireless transmit/receive unit (WTRU) has more than one SIM card (e.g., more than one universal subscriber identity modules (USIMs), under some systems, the WTRU performs separate network registration and authentication procedures for each USIM, in order for a user to access the services provided by each USIM. This is inefficient, as the registration and authentication procedures are time and resource consuming. For example, a WTRU may perform two separate registration and authentication procedures to identify the SIM cards, which is a time and resource-consuming process. Further, security procedures for WTRUs with more than one SIM card may result in a large number of exchanged messages in order to ensure that all subscriptions involved are authenticated.

Accordingly, there is a need for enhanced registration and security procedures for WTRUs with multiple universal subscriber identity modules (MUSIM).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for registration and security for wireless transmit/receive units (WTRUs) with multiple universal subscriber identity modules (USIMs). Optimized registration and authentication procedures, that enable a WTRU to register and authenticate multiple USIMs during one registration and authentication procedure are described herein. The techniques described herein may eliminate the need for separate registration and authentication procedures for each USIM.

In accordance with one embodiment, a WTRU may inform the network in a Registration Request message that it is registering multiple USIMs. The network and the WTRU may then perform an authentication procedure with an aggregate challenge/response (i.e., a single authentication challenge and single authentication response for all USIMs). For example, an authentication procedure may be modified so that a challenge message comprises multiple random numbers (RANDs), and the response message contains multiple responses (RESs). The WTRU may include one Subscription Concealed Identifier (SUCI) for USIM1 and an indication for a multiple USIM (MUSIM) registration (USIM1 and USIM2) to perform an authentication procedure with a MUSIM aggregate challenge/response. The WTRU may receive a single authentication challenge but two next generation Key Set Identifiers (ngKSIs). The mobile equipment ME may pass RES1 as an authentication challenge to USIM2 and may obtain a first aggregate authentication response RES2. The WTRU may include the aggregate authentication response, RES2, in the authentication response sent to the network. In another example, a gateway device may inform the network in a Registration Request message that it is registering multiple devices (i.e., multiple WTRUs). The network and the gateway may then perform an authentication procedure with an aggregate challenge/response (i.e., a single authentication challenge and single authentication response for all WTRUs).

In accordance with another embodiment, a WTRU may perform a registration for both USIM cards by inserting a flag and using a parent identity. Based on operator settings, the network sends only one Globally Unique Temporary Identifier (GUTI) for the first (parent) identity) in the Registration Accept. The WTRU may then determine the second GUTI. In one example, a WTRU may send a registration message associated with two identities, wherein the registration comprises a flag indicative of a first identity of the two identities. The WTRU may then receive from a network, a Registration Accept message comprising one identifier associated with the first identity. The WTRU may then determine, based on the Registration Accept message, a second identifier associated with a second identity of the two identities.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

Furthermore, like reference numerals in the figures indicate like elements, and wherein.

DETAILED DESCRIPTION

Methods and apparatuses are described herein for registration and security for wireless transmit/receive units (WTRUs) with multiple universal subscriber identity module (USIM). In accordance with one embodiment, a WTRU may inform the network in a Registration Request message that it is registering multiple USIMs. The network and the WTRU may then perform an authentication procedure with an aggregate challenge/response (i.e., a single challenge and a single response for all USIMs). In another example, a gateway device may inform the network in a Registration Request message that it is registering multiple devices (i.e., multiple WTRUs). The network and the gateway may then perform an authentication procedure with an aggregate challenge/response (i.e., a single challenge and single response for all WTRUs).

Figure 1A:
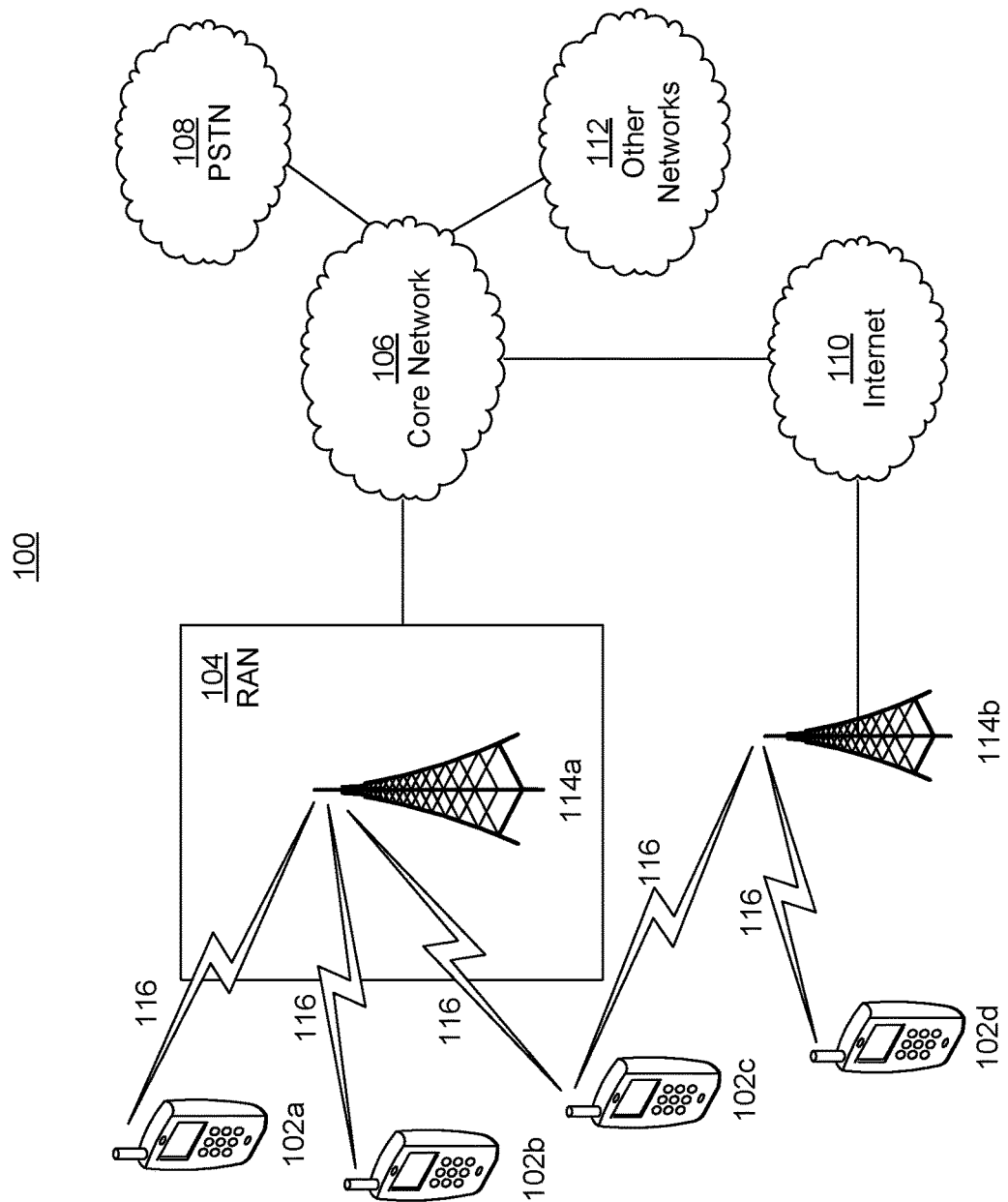
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include WTRUs 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
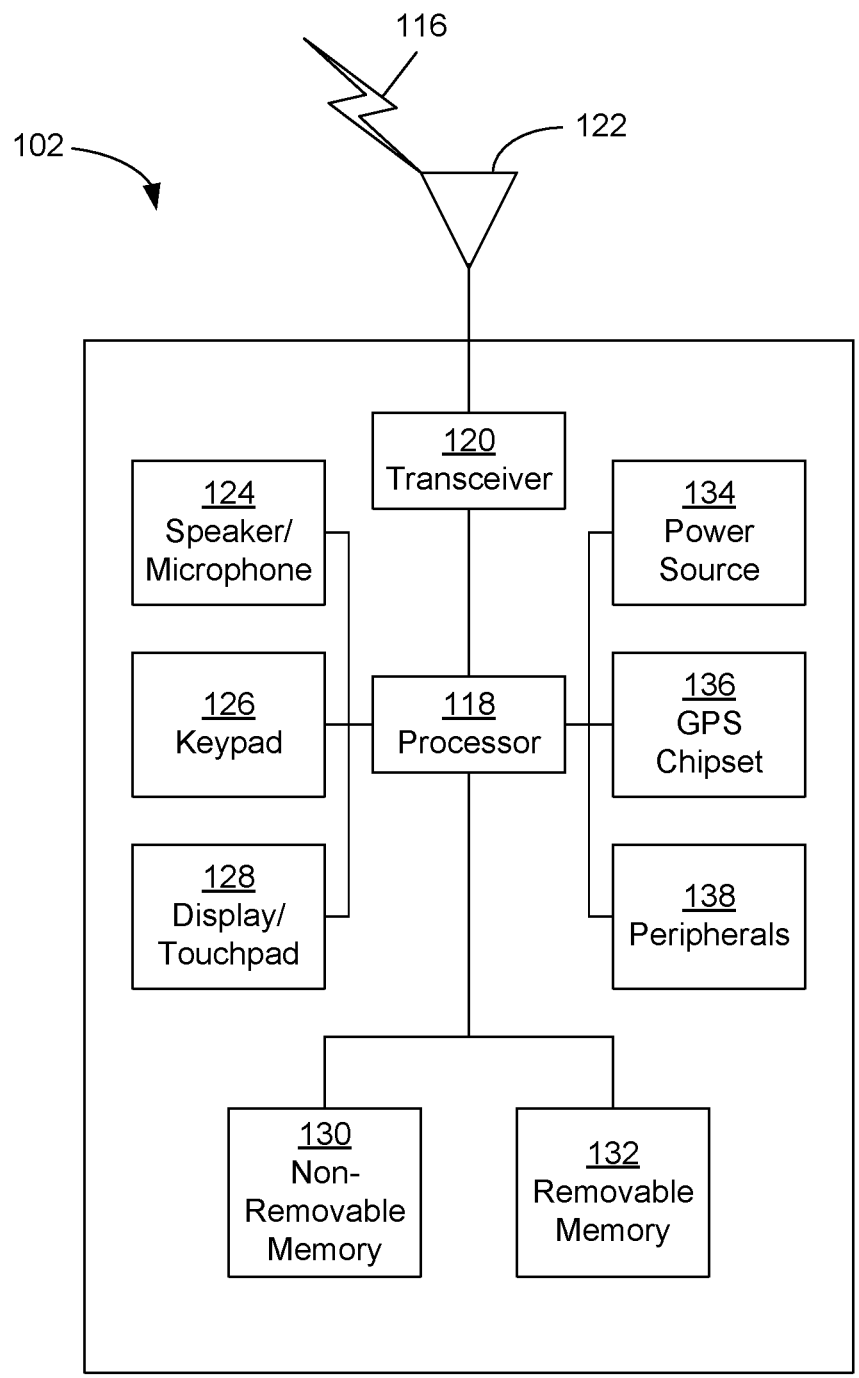
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
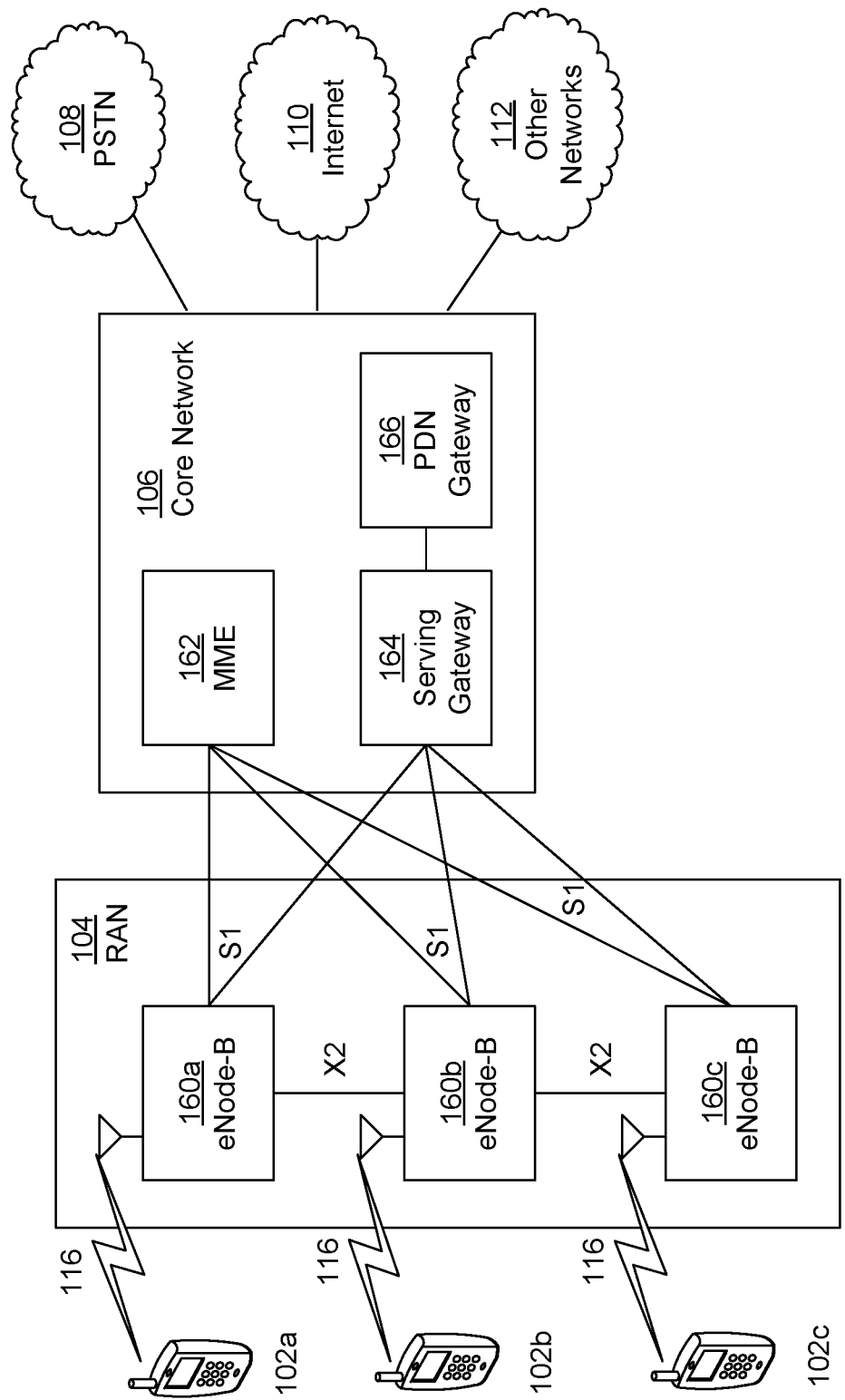
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths and carriers are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
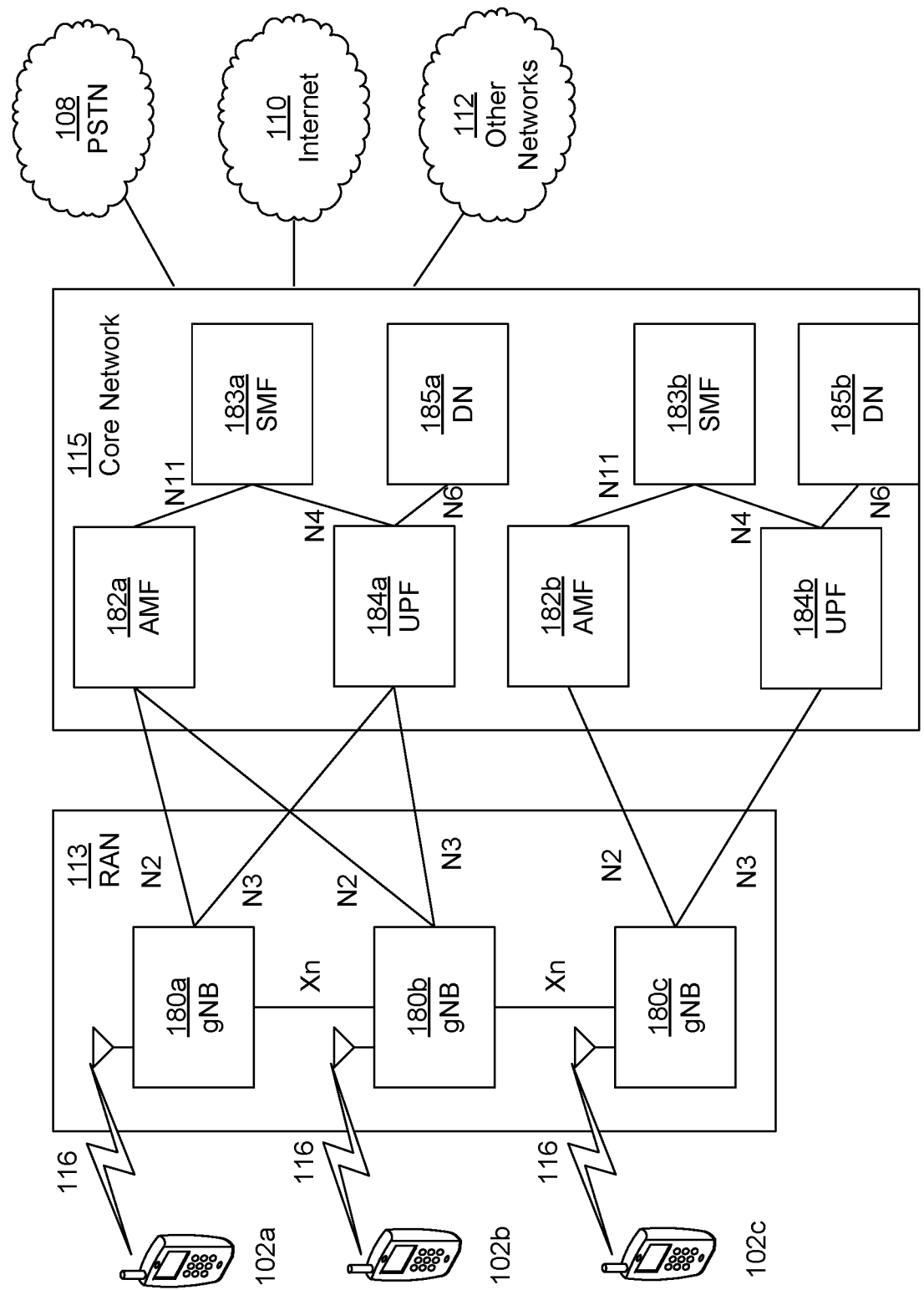
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or anon-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As aforementioned, the methods and apparatuses described herein are directed to registration and security for WTRUs with MUSIM. Multiple USIMs may be registered using an authentication procedure with an aggregate challenge/response (i.e., a single challenge/response for all USIMs). An aggregate challenge/response may be used by a gateway to register multiple WTRUs devices (e.g, MTC/IoT devices).

Figure 2:
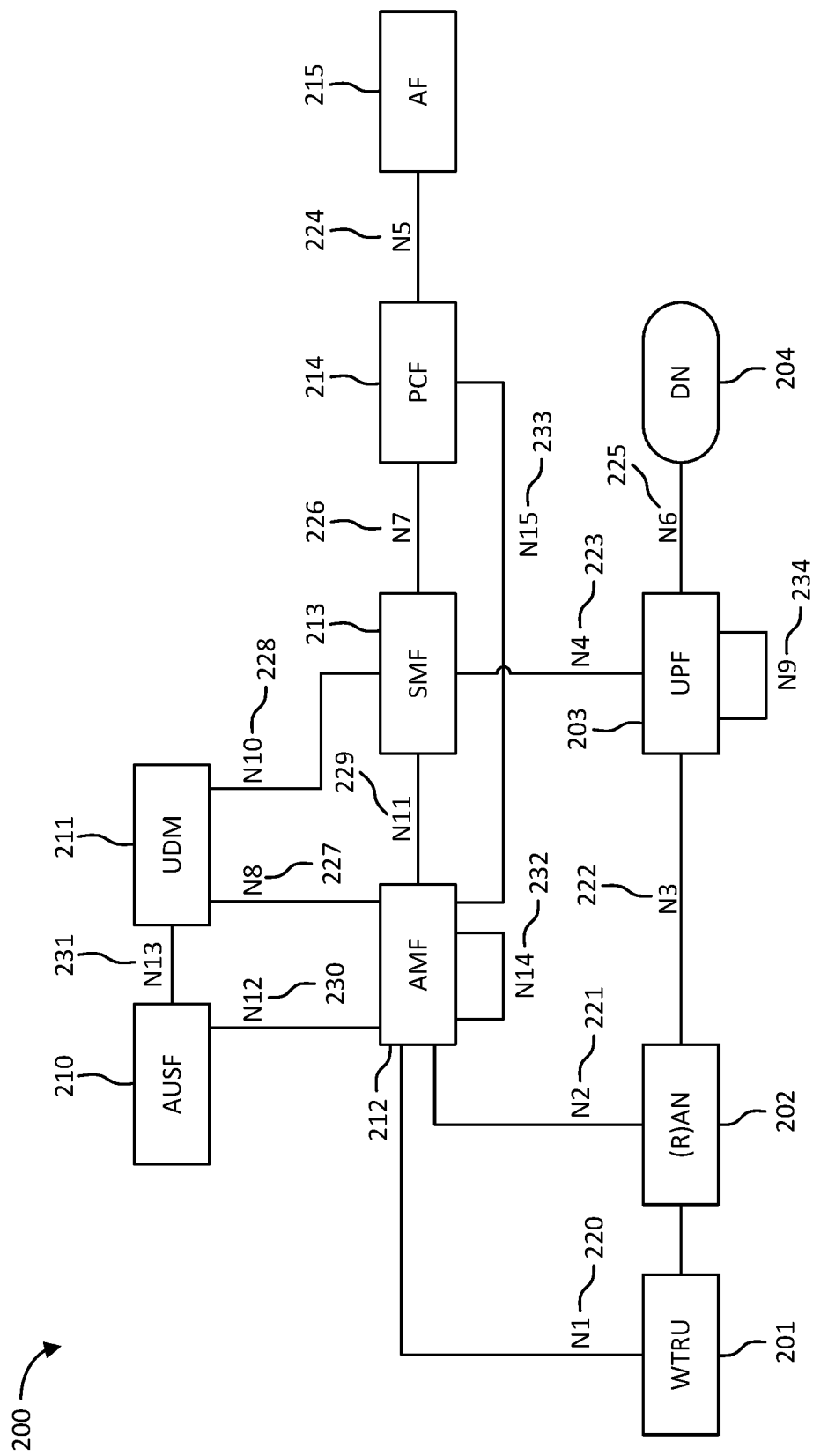
FIG. 2 is diagram of a reference model of a potential architecture of 5G or NextGen network.

FIG. 2 is a reference model of an example architecture of 5G or NextGen network. RAN as used in this example refers to a radio access network based on the 5G RAT or Evolved E-UTRA that connects to the NextGen core network. The Access Control and Mobility Management Function (AMF) 212 includes the following functionalities, Registration management, Connection management, Reachability management, Mobility Management, etc. The Session Management Function (SMF) 213 includes the following functionalities, Session Management (including Session establishment, modify and release), WTRU IP address allocation, Selection and control of UP function, etc. The User plane function (UPF) 203 includes the following functionalities, Packet routing & forwarding, Packet inspection, Traffic usage reporting, etc.

As shown in the example of FIG. 2, WTRU 201 has access, via RAN 202, to AMF 212 over N1 interface 220. N14 interface 232 is also shown. RAN 202 has access to AMF 212 via N2 interface 221. RAN 202 has access to UPF 203 via N3 interface 222. UPF 203 has access to SMF 213 via N4 interface 223. N9 interface 234 is also shown. UPF 203 has access to DN 204 via N6 interface 225. The example of FIG. 2 also shows other NFs within the control plane. PCF 214 may be in communication with SMF 213 via N7 interface 226. PCF 214 may be in communication with SMF 213 via N7 interface 226. PCF 214 may be in communication with AMF 212 via N15 interface 233. SMF 213 may be in communication with AMF 212 via N11 interface 229. SMF 213 may be in communication with UDM 211 via N10 interface 228. AMF 212 may be in communication with UDM 211 via N8 interface 227. AMF 212 may be in communication with AUSF 210 via N12 interface 230. UDM 211 may be in communication with AUSF 210 via N13 interface 231.

Registration for a Dual-SIM WTRU is described herein. When a WTRU needs to access services in 3GPP, it may initiate a registration procedure. The procedure may be referred to as Location Update, Attach, Routing/Tracking Area Update. In all the above cases, the common denominator is that the WTRU and the network establish a signaling connection and then a Mobility Management (MM) Context is established in both the WTRU and the anchor node of the Core Network. The parameters that constitute the MM-Context may comprise different parameters for different access technologies, also referred to as the "mode" that the WTRU is operating in. For example, when the access technology is E-UTRAN, the mode may be referred to as "S1 Mode". Legacy WTRUs in the market have been equipped with one SIM card. This means that when the WTRU starts the registration procedure, it has to identify itself based on the SIM card that is inserted in the device. It is then common practice for the network (NW) to authenticate that SIM card and also create Security Context for e.g. Integrity protection and Ciphering of both signaling and user data.

Release 16 of 3GPP has introduced requirements for devices that can carry more than one SIM card. This means that, if the user wants to access services provided by both SIM cards, they have to register for both.

Authentication and Security Mode Control procedures are described herein. While the NW can trigger the creation of the Security Context at any time when there exists a signaling connection between the WTRU and the Core NW, it is typically done during the registration procedure. The NW first starts with the Authentication challenge in order to validate the SIM card used on the device. The Authentication procedure may be referred to as Authentication and Key Agreement (AKA) procedure because the WTRU may then create certain master and session keys, for Integrity and Ciphering purposes, locally on the SIM card. The serving NW also receives, from the home NW, the same master keys and derives the same session keys when the anchor node requested the vectors for security.

The NW may start the procedure by sending an "Authentication Request" message to the WTRU, which carries a random challenge, referred to as "RAND". The WTRU is then supposed to use this parameter (RAND), along with a long-term key ("K") stored on the SIM card, to derive a response (generally referred to as "RES") and then respond to the challenge by sending an "Authentication Response" message. The NW may then perform a local check between the RES received from the WTRU and the one received from home NW in the Authentication vector. Once this phase is passed successfully, the NW may continue with the Security Mode Control procedure.

While the Authentication procedure used to be a one-way (NW authenticating the WTRU) procedure in legacy systems, it was enhanced to become a mutual authentication procedure later from the third generation in order to make it possible for the WTRU to also validate the Core NW. Starting with UMTS (3G) the NW also includes a parameter, referred to as the Authentication Token (AUTN), in the Authentication Request message. The USIM checks whether AUTN can be accepted and, if so, produces a response RES that is sent back to the NW. If the AUTN verification is successful, then the WTRU will deem this NW as legitimate.

If the WTRU passes the Authentication challenge, the NW follows up with a Security Mode Control procedure by sending the "Security Mode Command" message, which contains certain selected algorithms. Note that the keys for these algorithms are ultimately derived from the long term-key "K" by the WTRU and the NW as described above during the AKA procedure.

Several issues with the Registration, Authentication, and Security Mode Control procedures described above are addressed by the embodiments described herein.

When the WTRU has more than one SIM card, under some systems, the WTRU goes through two separate registration procedures to identify the SIM cards. This procedure can also get more complicated based on the Core NW operator(s), i.e. whether both UICC cards or USIMs belong to the same operator (same PLMN) or different ones. The device can perform two completely separate and unrelated registration procedures, one for each UICC card or USIM. However, since the registration procedure is time and resource consuming (also, for single TX WTRU, a conflict may occur when the WTRU has to perform two registration procedures for each USIM concurrently, e.g. due to WTRU mobility), the WTRU and the NW would benefit from saving time and resources. Embodiments described herein enable the WTRU to identify itself as "two" different users with different identities, in the same procedure.

As mentioned above, the security procedures are typically done in conjunction with the registration procedure. If it is assumed that the WTRU identifies itself as two separate users/identities, then there is also a need to separate the Authentication and Security Mode Control procedures. Solutions are provided herein for the WTRU and the NW to minimize the number of exchanged messages while ensuring that all subscriptions (i.e., USIMs) involved are authenticated, in order to maintain at least the same level of security as for a configuration with a single USIM.

Some systems use the subscription identifier (SUPI in 5GS or IMSI in 4G and below) for WTRU identification. With multiple removable UICCs, the use of one of the removable UICCs as an authenticated identity of the WTRU is questionable from a security point of view, and may require an additional cryptographic or hardware binding between two or more removable UICCs. However, with multiple USIMs, based on a single UICC, such binding is already established and can be used to provide an authenticated identity for the WTRU. Such an authenticated identity may be used for any interaction of the WTRU with the Network. In the absence of cryptographic or hardware binding between two or more removable UICCs, it is recommended to limit use cases to ones with multiple USIMs based on a single UICC.

Solutions for use in the registration procedure for identification of more than one SIM are described herein. For exemplary purposes, two separate cases are analyzed herein:
(1) Both USIMs are from the same operator (same PLMN); and
(2) The USIMs belong to two different operators When both USIMs are from the same operator, the WTRU may inform the NW in the Registration Request message that it is performing a Dual Registration by performing the following steps:

The WTRU may insert a flag or a new code-point in an information element, e.g., the Registration Type information element, indicating that this particular registration relates to two SIM cards. If the dual registration is enabled during an initial registration procedure, the WTRU may implicitly indicate that all following Registration Update procedures are for both USIMs (i.e., the WTRU does not need to insert the flag or new code-point into all Registration Requests).

Based on the type of subscription, the WTRU may identify itself with one (parent) identity, which implicitly means that the other SIM card is also requesting registration. This means that the Core NW is aware that both identities (e.g., the parent identity and the child identity) are related to each other and that when the WTRU uses one of them (e.g., the parent identity) for identification purpose, the other one (e.g., the child identity) is also requested.

Alternatively, the WTRU may send both identities (e.g., the parent identity and the child identity) in the same Registration Request message in two different IEs.

In yet another alternative, the WTRU may provide a multi-SIM-SUPI, which may be enabled by subscription. This is similar to the single parent identity case described above except that there is a single identity for all SIM cards that are part of the multi-SIM subscription. When the subscriber obtains a new SIM card that the subscriber wishes to be part of a multiple subscription, the operator configures the new SIM credentials and a new multi-SIM 5G-GUTI may be associated with the subscriptions that the subscriber wishes to link to the multiple subscription.

Upon completion of the registration, the NW may send a Registration Accept message and include "two" different GUTIs in the message. Or a multi-USIM-GUTI may be included in the message if the WTRU provided a multi-USIM-SUPI. Note that the Network may still provide different parameters for each USIM card that is part of the multi-SIM subscription. This is similar to the 3GPP/Non-3GPP case in which a single 5G GUTI is used with different Registration Managements (RM) contexts, one per access, except that here the Network generates different RM context per USIM. Additionally, the NW may, if the configuration authorizes it, associate a USIM to an Access.

The NW may also provide different parameters for different GUTIs in the same Registration Accept message, e.g., different Registration Areas may be assigned with each GUTI.

In an alternative, based on the operator settings and agreements, the NW may only send a first GUTI for the first identity and then both the WTRU and the NW may locally calculate the second GUTI that would apply to the second identity. The algorithm for doing so may be provided on the SIM card.

When the USIMs belong to two different operators, the following steps may be performed:

The WTRU may inform the NW that the Registration Request comprises requests for two different SIM cards by, e.g. using a special code-point in the Registration Type IE or inserting a new IE.

The WTRU may either send two identities, where the second identity is not provisioned by the NW that the WTRU is attaching to, or the WTRU may send one identity. The WTRU may additionally provide the PLMN ID and security information for the second identity in order that the NW may establish connections with the other NW for the second identity (e.g., a second USIM).

In the latter case, the Core NW may first create a secure signaling connection and then ask for the IMSI/SUPI number of the WTRU corresponding to the second ID used. The Core NW then may take the second ID (IMSI/SUPI or GUTI) and route the request to the other PLMN.

When the procedure is finalized, the Core NW may send two different GUTIs to the WTRU if the new GUTIs are allocated.

Solutions for used in the Security aspects are described herein. For exemplary purposes, the solutions below assume that the USIMs are from the same MNO. An authentication procedure with a multiple challenge-response combined is described herein.

Figure 3:
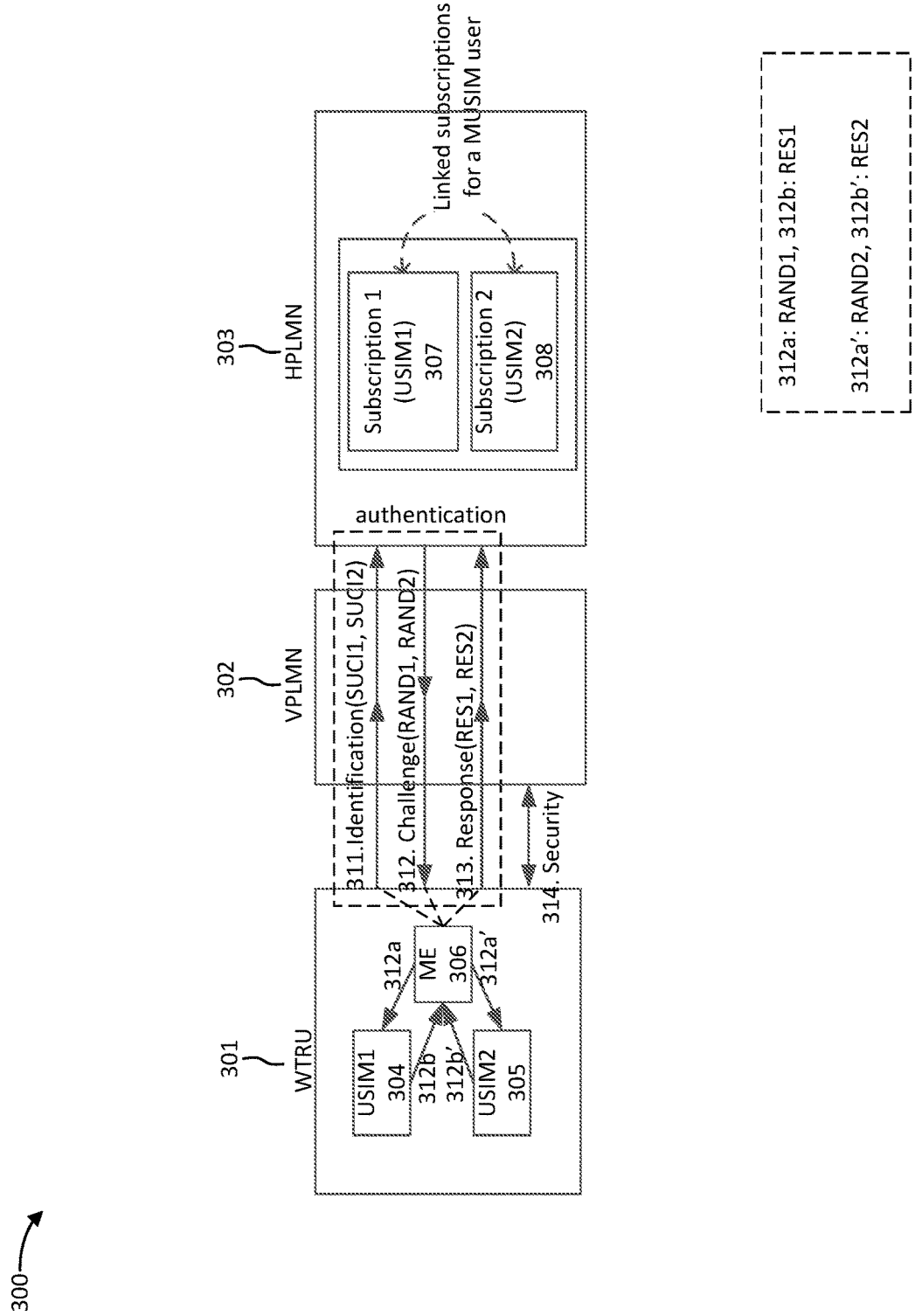
FIG. 3 is a diagram of a high-level view of a solution for a MUSIM authentication where the WTRU authenticates the various USIMs with the network using a combined authentication procedure.

FIG. 3 shows a high-level example 300 of MUSIM authentication where the WTRU authenticates the various USIMs with the network using a combined authentication procedure, in accordance with one embodiment, which may be used in combination with any of the embodiments described herein. The multiple identities, authentication challenges, and responses (i.e., one response for each USIM) may be exchanged, using a common single message exchange, among the WTRU, serving network, and home network. In the example of FIG. 3, WTRU 301 may comprise two USIMs (e.g, USIM1 304 and USIM2 305). However, the principles and steps outlined herein may be generalized for N (>2) MUSIMs. In the example of FIG. 3, ME 306 may be responsible for dispatching (e.g., in parallel) the authentication challenges from the network to the various USIMs (e.g, USIM1 304 and USIM2 305) and for collecting the various authentication responses to be transmitted back to the network. Each USIM may have an associated subscription in the Home Public Land Mobile Network (HPLMN) 303. For example, USIM1 304 may be associated with subscription 1 307, and USIM2 305 may be associated with subscription 2 308. Subscription 1 307 and subscription 2 308 may comprise linked subscriptions for a MUSIM user (e.g., WTRU 301). This solution does not impact the existing ME-USIM interface. The authentication procedure steps may comprise the following:

At step 311, WTRU 301 may send, to VPLMN 302, the concealed long-term identities (i.e., SUCI1 and SUCI2) in an initial identification message. Alternatively, the WTRU may include only one of the SUCI (e.g., primary subscription) and include an indication for a MUSIM authentication. In that case, the HPLMN may retrieve the linked subscriptions assuming that a linkage exists in the subscription database (e.g., one or more linked secondary subscriptions). HPLMN 302 may resolve the long-term identities (i.e., SUPIs) from the provided SUCIs to generate the respective authentication vectors. If only one SUCI is provided by the WTRU (with an indication for MUSIM authentication), the HPLMN may implicitly retrieve the one or more linked SUPI(s) and generate their respective authentication vectors.

At step 312, WTRU 301 may receive, from VPLMN 302, an Authentication Challenge message comprising the multiple RANDs (e.g., RAND1, and RAND2). The challenge message may also comprise multiple AUTNs (e.g., one for each USIM). The RANDs may be provided in the same order used for the SUCI in the initial identification message from the WTRU at step 311. With each RAND a next generation Key Set Identifier (ngKSI) may be provided to identify later during SMC a security context.

ME 306 may dispatch each RAND/AUTN pair to its respective USIM (e.g., in parallel). ME 306 may obtain the response RES from each USIM. Note that the production of the RES parameter by the USIM may signify the success of AUTN verification. At step 312a, ME 306 may send a RAND1 to USIM1 304. At step 312b, ME 306 may receive the response RES (RES1) from USIM1 304. At step 312a', ME 306 may send a RAND2 to USIM2 305. At step 312b', ME 306 may receive the response RES (RES2) from USIM2 305.

At step 313, WTRU 301 may reply with an Authentication Response message comprising the multiple RES (e.g., RES1 and RES2; one for each USIM). The RESs may be provided in the same order used for the SUCI in the initial message from the WTRU.

At step 314, upon successful authentication for a given USIM, VPLMN 302 may perform an SMC procedure with that USIM to establish the NAS security context between WTRU 301 and VPLMN 302. ME 303 may determine which USIM is the target of the SMC procedure based on the ngKSI parameter in the Security Mode Command message. It is the ngKSI that points to the individual security context corresponding to the individual AKA run at a given USIM.

Figure 4:
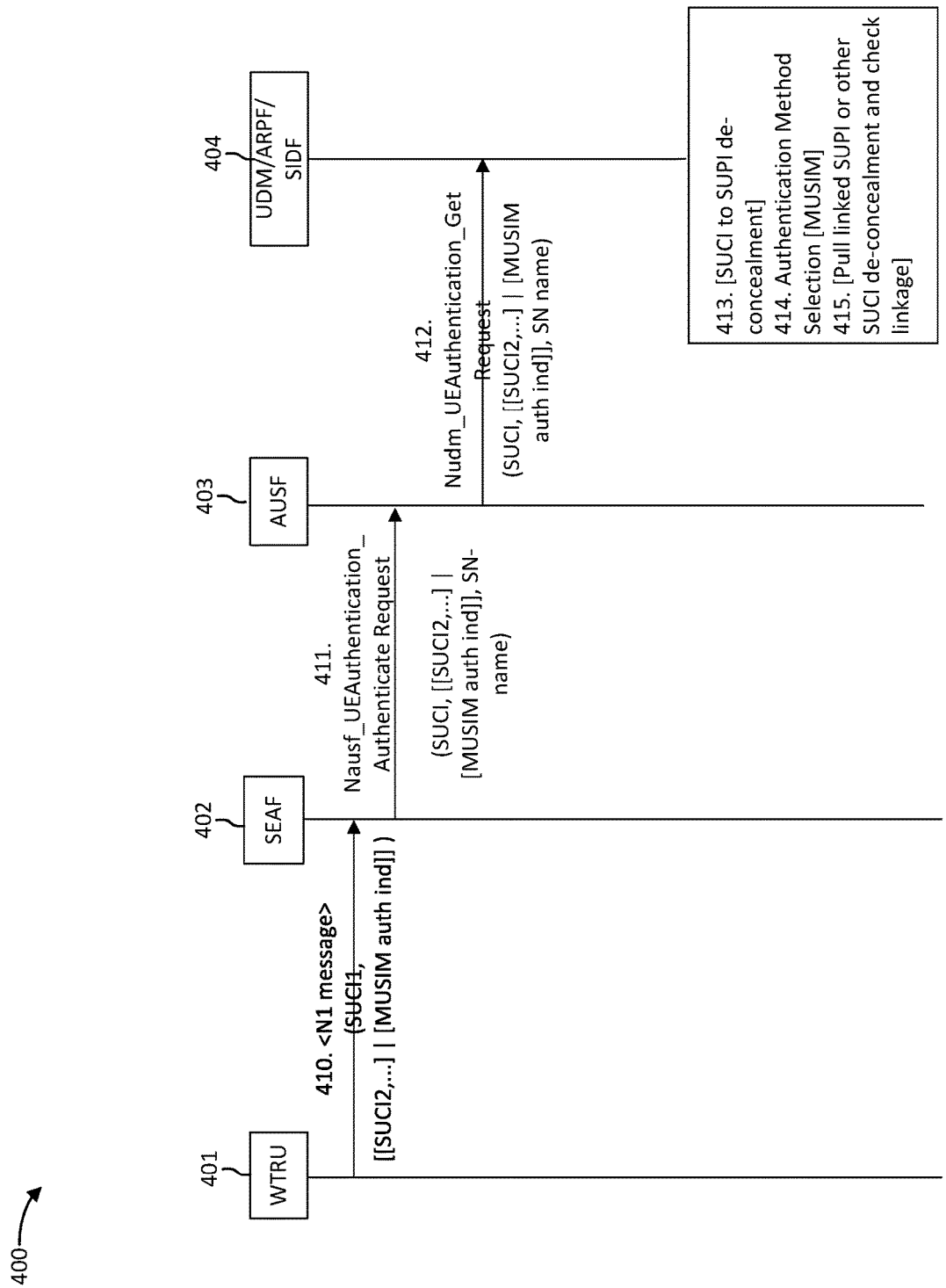
FIG. 4 is a diagram of an identification portion of the authentication procedure.

FIG. 4 illustrates the identification portion of the authentication procedure 400 in accordance with one embodiment, which may be used in combination with any of the embodiments described herein. In the example of FIG. 4, the 5G AKA authentication protocol may be used as a baseline. At step 410, WTRU 401 may send multiple SUCIs in an Initial NAS Registration message to the SEAF/AMF 402 in the serving network. At step 411, SEAF 402 may forward, to the AUSF 403 in the home network, the SUCIs. At step 412, AUSF 403 may send the SUCIs to the subscription database (UDM/ARPF) 404. At step 413, UDM 404 may determine, based on the subscription, that the request is for the authentication of a MUSIM capable WTRU. At step 414, UDM 404 may select a MUSIM optimized authentication method. At step 415, as mentioned above, the other USIM long term identifier may be omitted by the WTRU and obtained implicitly by the UDM 404 (e.g., based on WTRU provided indication and linkage of subscription data).

Figure 5:
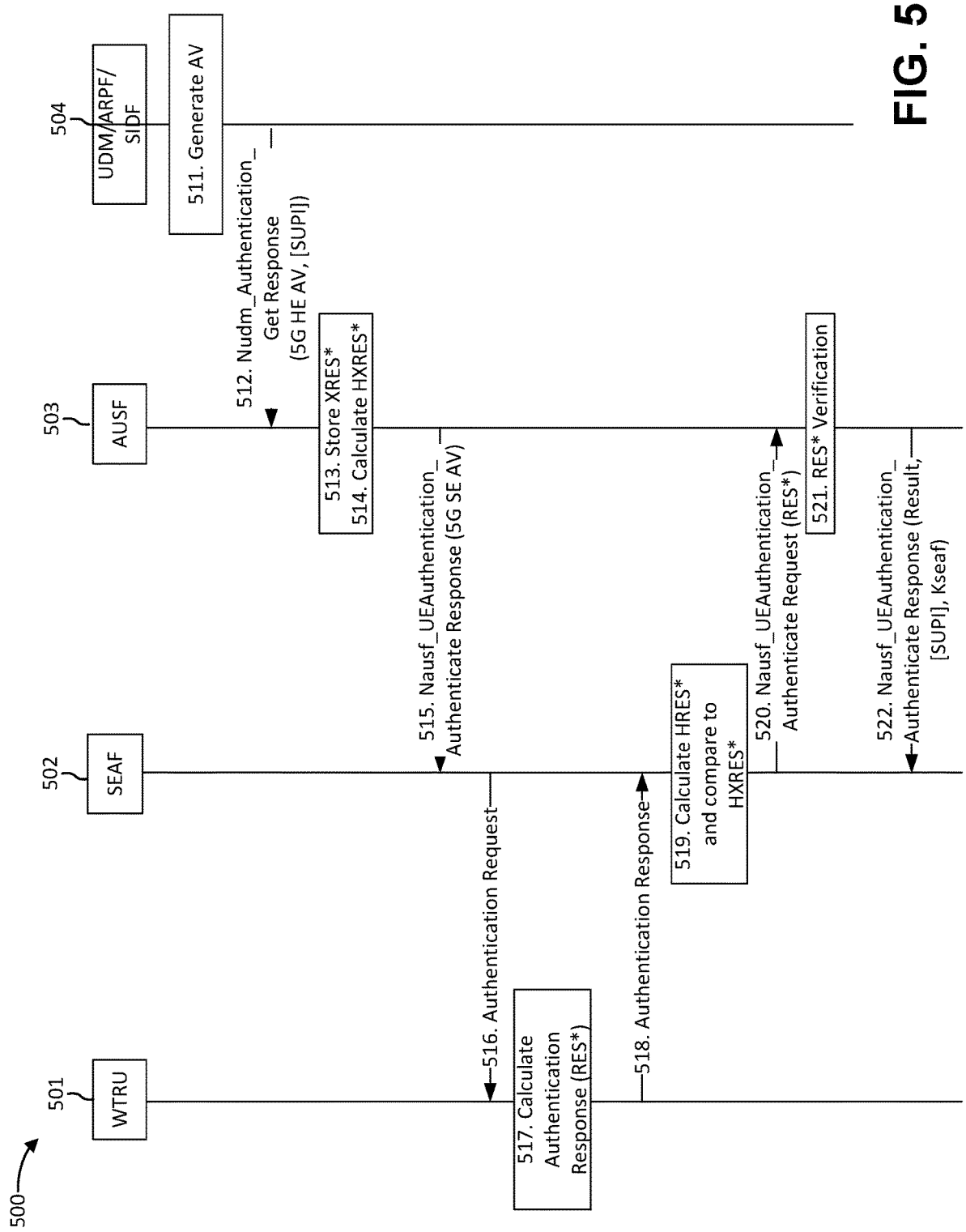
FIG. 5 is a diagram of a 5G AKA authentication procedure.

FIG. 5 illustrates the 5G AKA authentication procedure 500 in accordance with one embodiment, which may be used in combination with any of the embodiments described herein. In the example of FIG. 5, the 5G AKA authentication protocol may be used as a baseline. At step 511, UDM 504 may generate multiple Authentication Vectors (AV) for multiple SUPIs (i.e. one for each USIM). At ste[ 512, UDM 504 may send multiple 5G Home Environment (HE) AVs and multiple SUPIs in a response to AUSF 503. At step 513, AUSF 503 may store the XRES*. At step 514, AUSF 503 may calculate multiple XRES*/HXRES*. At step 515, AUSF 503 may send multiple 5G Serving Environment (SE) AVs in a response to SEAF 502. At step 516, SEAF 502 may send multiple (ngKSI, RANDs) in an Authentication Request message to WTRU 501. The RANDS may be provided in the order that the SUCIs were provided by WTRU 501 during the authentication initiation phase.

At step 517, the ME of WTRU 501 may dispatch the multiple RANDs to their respective USIM and may collect the multiple RES* from the USIMs. At step 518, WTRU 501 may send the multiple RES* to SEAF 502 in an authentication response (e.g., in the same order of SUCI and/or RANDs). At step 519, SEAF may calculate the HRES* and match the multiple RES* with the values in the multiple AVs in the serving and home network, respectively.

A successful authentication may be followed by an SMC procedure for each USIM to establish its individual security context. The registration procedure may complete with separate Registration Accept messages (one for each USIM)

wherein each message carries a unique GUTI and use its separate security context. At step 520, SEAF 504 may send an authentication request to AUSF 503. At step 521, AUSF 503 may perform RES* verification. At step 522, AUSF 503 may send an authentication response to SEAF 502.

An authentication procedure with an aggregate challenge-response is described herein. For example, a the network and the WTRU may perform an authentication procedure with an aggregate challenge/response (i.e., a single challenge/response for all USIMs), or in another example, a gateway device may and the network may perform an authentication procedure with an aggregate challenge/response (i.e., a single challenge/response for all WTRUs).

Figure 6:
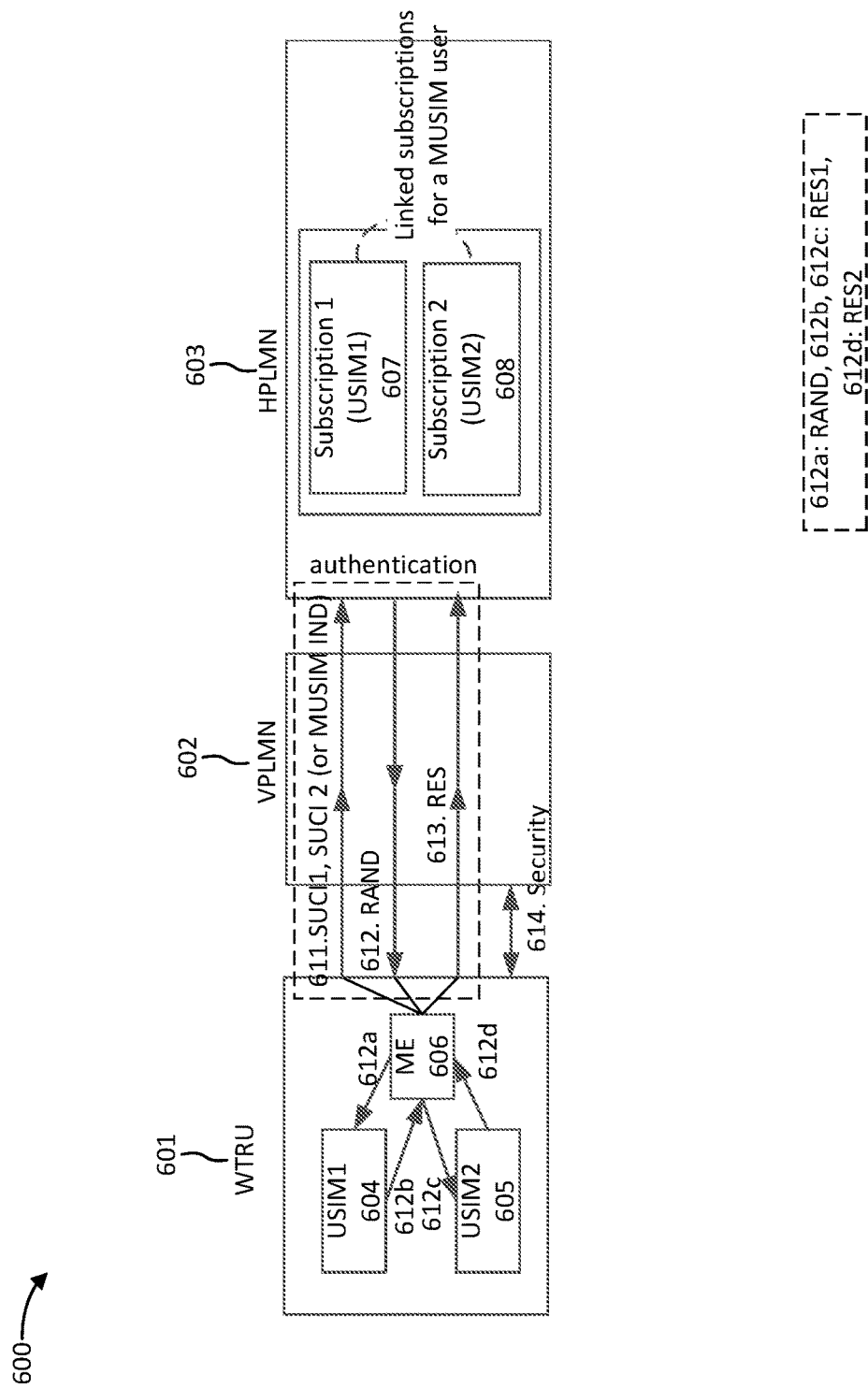
FIG. 6 illustrates a high-level view of a solution for a MUSIM authentication wherein a WTRU authenticates the various USIMs with the network using a combined authentication procedure.

FIG. 6 shows a high-level example 600 of MUSIM authentication wherein the WTRU authenticates the various USIMs with the network using a combined authentication procedure, in accordance with one embodiment, which may be used in combination with any of the embodiments described herein. A single authentication challenge and response (i.e., one for all USIM) may be exchanged between WTRU 601, the serving network, and the home network. In the example of FIG. 6, WTRU 601 may comprise two USIMs (e.g, USIM1 604 and USIM2 605). However, the principles and steps outlined herein may be generalized for N (>2) MUSIMs. In the example of FIG. 6, ME 606 may responsible for obtaining an aggregate authentication response from the USIMs (e.g, USIM1 604 and USIM2 605) based on the aggregate authentication challenge from the network. Each USIM may have an associated subscription in the HPLMN 603. For example, USIM1 604 may be associated with subscription 1 607, and USIM2 605 may be associated with subscription 2 608. Subscription 1 607 and subscription 2 608 may comprise linked subscriptions for a MUSIM user (e.g., WTRU 601). This solution may include enhancements to the existing ME-USIM interface.

At step 611, WTRU 601 may send, to VPLMN 602, one SUCI1 (for USIM1 604), a SUCI2 (for USIM2 605), and an indication for a MUSIM registration (USIM1 604 and USIM2 605) to perform an authentication procedure with a MUSIM aggregate challenge/response (i.e., a single challenge for all USIMs).

At step 612, during the authentication procedure, WTRU 601 may receive a single authentication challenge (RAND) but two ngKSIs (for respective Kamf identification) in a single Authentication Request message. At step 612a, ME 606 may pass the challenge RAND to USIM1 604. At step 612b, ME 606 may receive a response RES1. At step 612c, ME 606 may send the RES1 as an authentication challenge to USIM2 605. At step 612d, ME 606 may receive a first aggregate authentication response RES2. ME 606 may continue with this process of "daisy chaining" for as many USIMs as there are.

At step 613, WTRU 601 may send the aggregate authentication response, RES2, in the authentication response to the network (e.g., VPLMN 602). The SEAF/AMF may obtain two SUPI/Kseaf following a successful aggregate authentication.

At step 614, WTRU 601 may perform multiple SMC procedures (one for each USIM) to establish security. The WTRU may receive multiple Registration Accept messages (each one with own GUTI/NAS security).

The authentication procedure with an aggregate challenge-response may be expanded in order to apply to other use cases. For example, the authentication procedure with an aggregate challenge-response described above may apply to MTC/IoT cases as well. A subscriber may have a certain service with several (machine type) devices. An example of this includes a household or a "smart" factory subscriber with several devices connected to a network. For example, a house or a factory with a gateway operating in a network may have a plurality of WTRUs (e.g., IoT devices) operating in the network behind the gateway. These devices could all be connected to a "Master" device which, in turn, may communicate with the operator's network. This Master device may also act as a "gateway" between all other devices and the network. In order to facilitate the authentication procedures for every single device that needs to be verified by the network, the network may, in-line with the procedure described above, send only one authentication challenge (e.g., one RAND) to the gateway.

Figure 7:
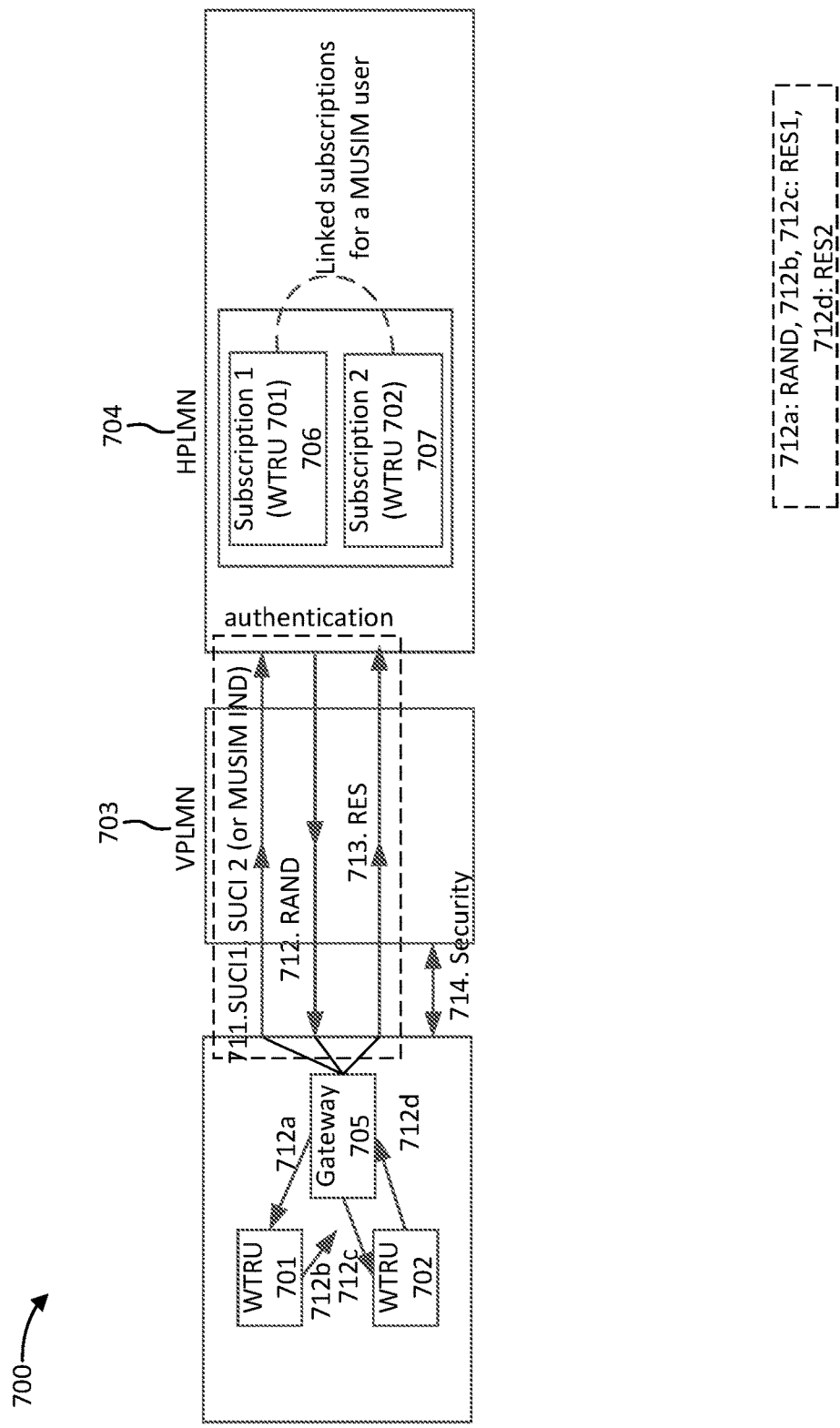
FIG. 7 illustrates a high-level view of a solution for a MUSIM authentication wherein a gateway authenticates various WTRUs with the network using a combined authentication procedure.

FIG. 7 shows a high-level example 700 of MUSIM authentication wherein only one authentication challenge is sent, in accordance with one embodiment, which may be used in combination with any of the embodiments described herein. At step 711, gateway 705 may send, to 703 602, one SUCH (for WTRU 701), a SUCI2 (for WTRU 702), and an indication for a MUSIM registration to perform an authentication procedure with a MUSIM aggregate challenge/response (i.e., a single challenge). In another example, the gateway may send the network a single "master" SUCH linked with one or more subscriptions associated with the plurality of WTRU operated behind the gateway. Each WTRU may have an associated subscription in the HPLMN 704. For example, WTRU 701 may be associated with subscription 1 706, and WTRU 702 may be associated with subscription 2 707. Subscription 1 706 and subscription 2 707 may comprise linked subscriptions for a MUSIM user (e.g., gateway 705).

At step 712, gateway 705 may receive a single authentication challenge (RAND). At step 712a, gateway device 705 may pass the authentication challenge (RAND) to the first device (e.g., WTRU 701). At step 712b, the gateway 705 may receive a response RES1 from WTRU 702. At step 712c, gateway 705 may send RES1 as an authentication challenge to the second device (WTRU 702). At step 712d, the gateway 705 may receive a first aggregate authentication response RES2. Gateway 705 may continue with this process of "daisy chaining" for as many devices (e.g., WTRUs) there are. At step 713, gateway 705 may send the aggregate authentication response RES2 in the authentication response sent to the network (e.g., VPLMN 703). As described above, the SEAF/AMF may obtain two SUPI/Kseaf following a successful aggregate authentication.

Having thus described the various embodiments, it is to be appreciated and will be apparent to those skilled in the art that the present embodiments are to be considered in all respects as illustrative and not restrictive. Although features and elements are described above in particular combinations, it is to be appreciated that each feature or element can be used alone or in any combination or sub-combination with or without the other features and elements. Any single embodiment described herein may be supplemented with one or more elements from any one or more of the other embodiments described herein. Any single element of an embodiment may be replaced with one or more elements from any one or more of the other embodiments described herein.

What is claimed is:

1. A wireless transmit/receive unit (WTRU) comprising:
a processor configured to:
send, to a network, a request message indicative of a request to authenticate at least:
a first subscriber identity module associated with the WTRU, and a second subscriber identity module associated with the WTRU;
receive, from the network, a first challenge message;
send, to the first subscriber identity module, the first challenge message;
receive, from the first subscriber identity module and based on the first challenge message, a first response message;
send, to the second subscriber identity module, the first response message that was received from the first subscriber identity module as an indication of a second challenge message;
receive, from the second subscriber identity module and based on the first response message, an aggregate response message that is configured to authenticate the first and the second subscriber identity modules; and
send, to the network in response to the first challenge message, the aggregate response message that is configured to authenticate the first and second subscriber identity modules.

2. The WTRU of claim 1, wherein the first subscriber identity module comprises a first universal subscriber identity module (USIM) and the second subscriber identity module comprises a second USIM.

3. The WTRU of claim 1, wherein the first challenge message comprises one or more of one or more random numbers (RAND) or a plurality of key set identifiers (KSIs).

4. The WTRU of claim 1, wherein the aggregate response message enables authentication of the WTRU with the network.

5. The WTRU of claim 1, wherein the request message comprises:
a first subscription concealed identifier (SUCI) associated with the first subscriber identity module, and
a second SUCI associated with the second subscriber identity module.

6. The WTRU of claim 5, wherein the first SUCI is associated with a first subscription stored in a Home Public Land Mobile Network (HPLMN), and the second SUCI is associated with a second subscription stored in the HPLMN.

7. The WTRU of claim 1, wherein the request message comprises:
a first subscription concealed identifier (SUCI) associated with the first subscriber identity module, and
a multiple universal subscriber identity module (MUSIM) for MUSIM authentication indication.

8. A method for use in a wireless transmit/receive unit (WTRU), the method comprising:
sending, to a network, a request message indicative of a request to authenticate at least:
a first subscriber identity module associated with the WTRU, and
a second subscriber identity module associated with the WTRU;
receiving, from the network, a first challenge message;
sending, to the first subscriber identity module, the first challenge message;
receiving, from the first subscriber identity module and based on the first challenge message, a first response message;
sending, to the second subscriber identity module, the first response message that was received from the first subscriber identity module as an indication of a second challenge message;
receiving, from the second subscriber identity module and based on the first response message, an aggregate response message that is configured to authenticate the first and the second subscriber identity modules; and
sending, to the network in response to the first challenge message, the aggregate response message that is configured to authenticate the first and second subscriber identity modules.

9. The method of claim 8, wherein the first subscriber identity module comprises a first universal subscriber identity module (USIM) and the second subscriber identity module comprises a second USIM.

10. The method of claim 8, wherein the first challenge message comprises one or more of one or more random numbers (RAND) or a plurality of key set identifiers (KSIs).

11. The method of claim 8, wherein the aggregate response message enables authentication of the WTRU with the network.

12. The method of claim 8, wherein the request message comprises:
a first subscription concealed identifier (SUCI) associated with the first subscriber identity module, and
a second SUCI associated with the second subscriber identity module.

13. The method of claim 12, wherein the first SUCI is associated with a first subscription stored in a Home Public Land Mobile Network (HPLMN), and the second SUCI is associated with a second subscription stored in the HPLMN.

14. The method of claim 8, wherein the request message comprises:
a first subscription concealed identifier (SUCI) associated with the first subscriber identity module, and
a multiple universal subscriber identity module (MUSIM) for MUSIM authentication.

15. An apparatus comprising:
a processor configured to:
send, to a network, a request message indicative of a request to authenticate at least:
a first subscriber identity associated with a first wireless transmit/receive unit (WTRU), and
a second subscriber identity associated with a second WTRU;
receive, from the network, a first challenge message;
send, to the first WTRU, the first challenge message;
receive, from the first WTRU and based on the first challenge message, a first response message;
send, to the second WTRU, the first response message that was received from the first subscriber identity module as an indication of a second challenge message;
receive, from the second WTRU and based on the first response message, an aggregate response message that is configured to authenticate the first and the second subscriber identity modules; and
send, to the network in response to the first challenge message, the aggregate response message that is configured to authenticate the first and second subscriber identity modules.

16. The apparatus of claim 15, wherein the first WTRU comprises a first Internet of Things (IoT) device and the second WTRU comprises a second IoT device.

17. The apparatus of claim 15, wherein the first challenge message comprises one or more of one or more random numbers (RAND) or a plurality of key set identifiers (KSIs).

18. The apparatus of claim 15, wherein the aggregate response message enables authentication of the first WTRU and the second WTRU with the network.

19. The apparatus of claim 15, wherein the request message comprises:
- a first subscription concealed identifier (SUCI) associated with the first WTRU, and
- a second SUCI associated with the second WTRU.

20. The apparatus of claim 15, wherein the first SUCI is associated with a first subscription stored in a Home Public Land Mobile Network (HPLMN), and the second SUCI is associated with a second subscription stored in the HPLMN.

* * * * *